W. J. ARMSTRONG.
PISTON.
APPLICATION FILED APR. 7, 1908.
908,932.
Patented Jan. 5, 1909.
2 SHEETS—SHEET 1.
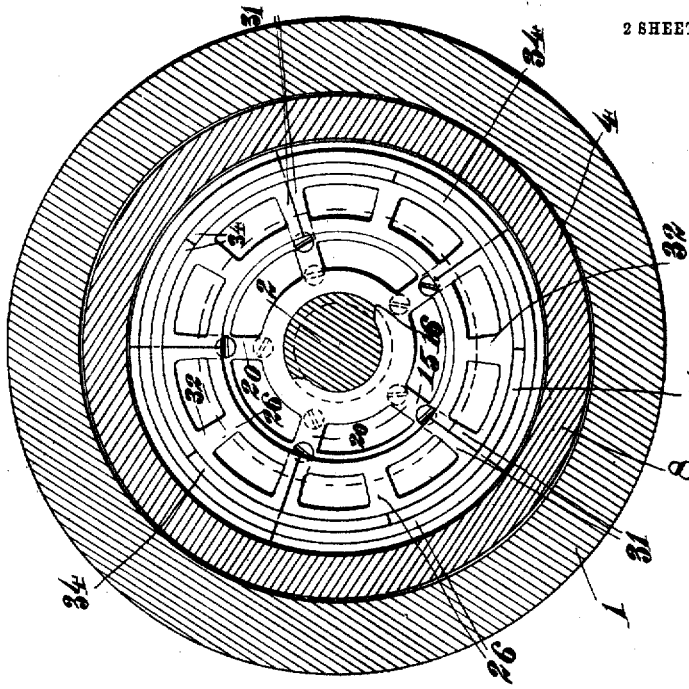
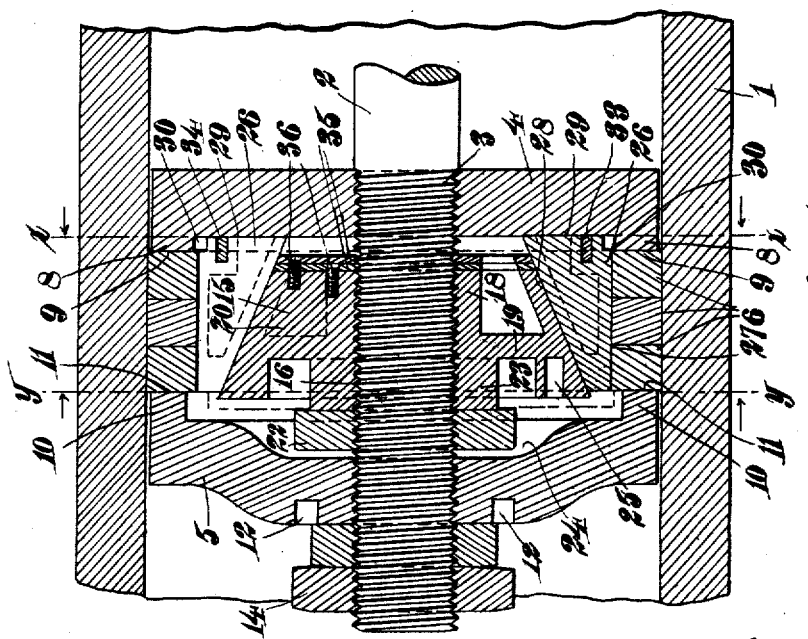
Witnesses;
A. A. Olson
P. J. McAllister.
Inventor;
Warren J. Armstrong
by
Joshua R. H. Potts.
Atty.

W. J. ARMSTRONG.
PISTON.
APPLICATION FILED APR. 7, 1908.
908,932.
Patented Jan. 5, 1909.
2 SHEETS—SHEET 2.
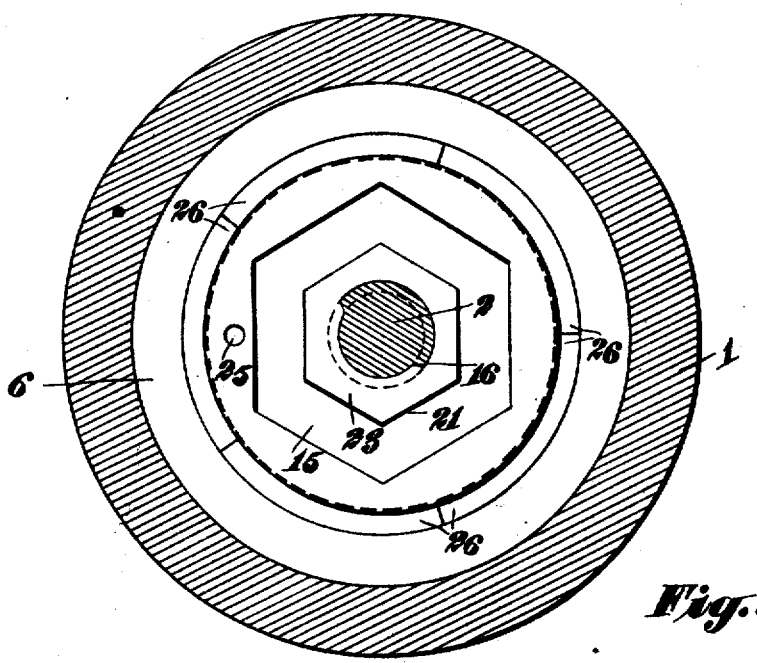
Fig. 3.
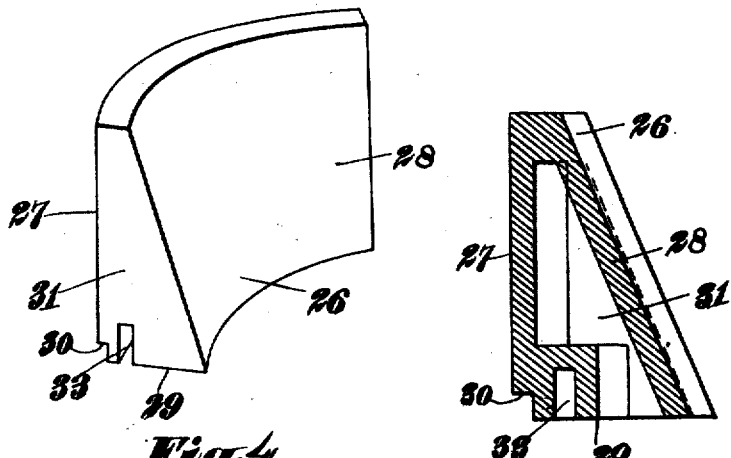
Fig. 4.
Fig. 5.
Witnesses:
Inventor:
Warren J. Armstrong

UNITED STATES PATENT OFFICE.

WARREN J. ARMSTRONG, OF CHICAGO, ILLINOIS.

PISTON.

No. 908,932.

Specification of Letters Patent.

Patented Jan. 5, 1909.

Application filed April 7, 1908. Serial No. 425,699.

*To all whom it may concern:*

Be it known that I, WARREN J. ARMSTRONG, a citizen of the United States, residing at Chicago, county of Cook, and State of Illinois, have invented certain new and useful Improvements in Pistons, of which the following is a specification.

My invention relates to pistons and particularly to pistons of pumps or pumping engines.

Although particularly adapted for use in the cylinders of pumps, it is to be understood that the piston hereinafter described is also applicable for use in steam engines or for like purposes.

The object of my invention is to provide means for expanding the packing rings of the piston to take up the wear to maintain a snug fit between the piston and the walls of the cylinder.

Other objects will appear hereinafter.

My invention consists generally in the piston and the various combination and arrangements of parts all as will be hereinafter fully described and particularly pointed out in the claims.

My invention will be more readily understood by reference to the accompanying drawings forming a part of this specification, and in which, Figure 1 is a central longitudinal section through the piston, Fig. 2 is a transverse section on the line $x$—$x$ of Fig. 1, Fig. 3 is a similar section on the line $y$—$y$ of Fig. 1, Fig. 4 is a perspective view of one of the ring expanding segments, and Fig. 5 is a section of the same.

Referring to the drawings, 1 indicates a portion of a cylinder in which the piston is arranged, and 2 the piston rod which is threaded as at 3 for a considerable distance from its end. The piston comprises the heads 4 and 5 between the inner peripheral edges of which, are held the packing rings 6 forming a hollow piston within which is arranged suitable means for expanding the packing rings to maintain a tight joint or snug fit between the piston and the cylinder walls. The head 4 comprises a disk threaded upon the piston rod and having a plane inner face 7 bounded by an annular raised portion or flange 8 having a plane face 9 parallel with the face 7. The member 5 is provided with a similar flange 10 between the plane face 11 of which and the face 9, the packing rings 6 are held. When the device is used as a pump piston the packing rings may be of rubber, leather or other suitable material, but when the device is employed as the piston of a steam engine, I prefer to employ split metallic rings. The member 5 is secured upon the piston rod and together with the member 4 and the packing rings forms a hollow and tight piston. The member 5 is recessed as at 12 in its outer face, that is, provided with a pair of holes to receive a wrench, by means of which the head 5 is secured tightly against the packing rings.

14 indicates a pair of lock nuts for holding the head in position after having been set.

Arranged within the hollow piston is a conical member threaded upon the rod 2 and interposed between said member and the packing rings is a hollow conical member formed of a plurality of segments. By adjusting the conical member on the threaded portion of the piston rod, the packing rings are expanded.

15 indicates the conical member having the threaded central bore 16 by which it is threaded upon the piston rod 2. This comprises the sleeve portion 17 and the conical periphery 18 which are joined by the transverse web 19 and a plurality of radial webs 20. The web 20 is some distance from the base of the cone and the portion of the sleeve 17 at the base of the cone is formed with the flattened faces 21 providing a wrench hold.

22 indicates a lock nut impinging against the base end of the sleeve portion which extends somewhat beyond the plane of the base of the conical portion as at 23. The inner face of the member 5 is concave to accommodate the nut 22, 24 indicating the concave portion.

25 indicates a hole or recess to receive the end of the tool for holding the member 15 from turning while the nut 22 is being tightened.

26 indicate a plurality of segmental members together entirely surrounding the conical member 15 and forming a hollow conical ring for expanding the packing rings. Each member 26 comprises an outer cylindrical wall 27 and inner conical wall 28, the former of which rests against and is substantially coextensive with the inner faces of the packing rings 6 and the latter bearing against the cone 18. The broad or base face 29 of the segments rests against the face 7 of the member 4 and the outer face of the wall 27 is offset as at 30 at a distance from the base 29 equal or substantially equal to the depth of the flange 8 in order that the portion 27 of the segments may enter freely between the faces 9 and 11 as the rings become worn. Each segment is provided with the end walls or webs 31 and the intermediate web 32. The faces 29 are provided with the annular grooves 33 into which are placed the steel or other metal segments 34. The segmental ring 34 is arranged with the sections staggered with those of the segments 26, that is, each segment 34 is arranged across the joint between two of the members 26. This forms the members 6 into a single expansion member and holds them in place while the device is being assembled.

The smaller end of the conical member 15 is laminated, that is composed of a plurality of plates 35 secured to the body or main portion of the member by the screws 36. It is evident that it is desirable to have the adjacent faces of the cone 18 and the segments 26 contact throughout as great an extent as possible and it is to this end, that the removable plates 35 are provided. As the rings 6 wear and the member 15 is adjusted toward the member 4, the plates 35 may be removed one at a time to give greater adjustment to the member 15.

Having described my invention what I claim as new and desire to secure by Letters Patent, is:

1. In a device of the class described, a piston rod threaded at the end in combination with a pair of piston end members threaded upon said rod, a packing ring arranged between the adjacent edges of said members, a conical member threaded upon said piston rod and between said end members and hollow segmental members interposed between said conical member and said rings, substantially as described.

2. In a device of the class described, a piston rod threaded at the end, a pair of piston end members threaded upon said rod and packing rings interposed between the adjacent peripheral edges of said members, forming a hollow piston, in combination with a conical member arranged upon said rod within said piston and segmental members interposed between said conical member and said rings, the end of said conical member being laminated, substantially as described.

3. In a device of the class described, a threaded piston rod in combination with a pair of piston end members threaded thereon, a packing ring arranged between the adjacent peripheral edges of said members, a conical member threaded upon said rod between said end members, segmental members interposed between said conical members and said rings and a lock nut for said conical member, substantially as described.

4. In a device of the class described, a piston rod threaded at the end in combination with a pair of piston end members threaded upon said rod and having inturned peripheral flanges, a packing ring interposed between the adjacent faces of said flanges, a conical member arranged upon said rod between said end members, and segmental members interposed between said conical member and said rings, said segmental members having an offset cylindrical peripheral wall substantially coextensive with said packing rings and adapted to project between said flanges as the rings become worn, substantially as described.

5. In a device of the class described, a threaded piston rod in combination with a pair of piston end members threaded thereon, a packing ring arranged between the adjacent peripheral edges of said members, a conical member arranged upon said rod between said end members and longitudinally adjustable thereon, segmental members interposed between said conical member and said ring, and a segmental ring binding said members into a single expansion member, the face of said segmental members being grooved to receive said ring, substantially as described.

In testimony whereof I have signed my name to this specification in the presence of two subscribing witnesses.

WARREN J. ARMSTRONG.

Witnesses:
HELEN F. LILLIS,
HOWARD S. AUSTIN.